United States Patent

Beccone et al.

[15] 3,656,069

[45] Apr. 11, 1972

[54] MULTIPHASE DIGITAL MODULATOR

[72] Inventors: John Peter Beccone, Middlesex; Kaneyuki Kurokawa, Murray Hill; Wolfgang Otto Schlosser, Basking Ridge, all of N.J.

[73] Assignee: Bell Telephone Laboratories, Incorporated, Murray Hill, Berkeley Heights, N.J.

[22] Filed: July 15, 1970

[21] Appl. No.: 55,116

[52] U.S. Cl. ............................332/16 R, 325/126, 325/145, 325/163, 332/30 R, 333/31 R

[51] Int. Cl. ..........................................................H03c 3/00

[58] Field of Search .....................332/16, 30, 9, 11; 333/1.1, 333/31; 325/145, 148, 126, 163

[56] References Cited

UNITED STATES PATENTS 3,454,906 7/1969 Hultin et al. ............................333/31

3,182,203 5/1965 Miller..............................333/1.1 UX 3,437,957 4/1969 Ames.................................333/1.1 X 3,506,930 4/1970 Gantick .............................333/1.1 X

*Primary Examiner*—Paul L. Gensler

*Attorney*—R. J. Guenther and Arthur J. Torsiglieri

[57] ABSTRACT

In one embodiment, high-speed phase modulation is provided by directing a microwave carrier into the first port of a circulator, reflecting it from variable locations of a reflecting transmission line connected to the second port, and directing it from the third port to a load. By selectively switching diodes, one directly connected, and one capacitively connected, to the reflecting line, four-level phase digital modulation is obtained.

9 Claims, 4 Drawing Figures

PATENTED APR 11 1972 3,656,069

INVENTORS: J. P. BECCONE
K. KUROKAWA
W. O. SCHLOSSER

BY Roderick B Anderson
ATTORNEY

MULTIPHASE DIGITAL MODULATOR

BACKGROUND OF THE INVENTION

This invention relates to phase modulation techniques, and more particularly, to techniques for high-speed multilevel digital phase modulation.

As is well known, it is often desirable to transmit information as digital pulses, rather than as analog signals because, among other reasons, such information is compatible with modern computer systems, and also because of the fidelity with which digital pulses can be periodically regenerated and transmitted. It is also often desirable to convert the pulse information to digital phase modulations so that each pulse is manifested as a phase change of a high frequency carrier wave. This further reduces transmission degradation, and facilitates the use of high frequency carriers having large bandwidth capacities.

One straightforward technique for phase modulating a carrier wave is to vary, or to switch on and off, a reactance through which the carrier wave is transmitted. As the carrier frequency increases, however, it can be appreciated that the response time of any such variable reactance must be made progressively smaller. Moreover, such devices tend to attenuate the carrier wave.

Rather than transmitting information as two-level or binary data, it is sometimes desirable to transmit it as multilevel data, such as pulses having four discrete amplitude levels. Generally speaking, if an analog signal, such as voice information or the like, is transmitted as four-level digital information, less transmission bandwidth is required than with two-level modulation. On the other hand, the likelihood of degradation generally increases with the number of digital levels because of the increased likelihood of faulty discrimination between the levels. Nevertheless, a need has developed for apparatus that will convert four-level digital data to phase modulations of a high frequency microwave carrier. To minimize the likelihood of faulty discrimination, the four carrier wave phases generated by the four amplitude levels should be mutually separated by phase differences of 90° or $\pi/2$ radians.

SUMMARY OF THE INVENTION

It is an object of this invention to provide high-speed multilevel digital phase modulation.

This and other objects of the invention are achieved in an illustrative embodiment thereof comprising a reflecting transmission line connected to a carrier wave transmission line by a circulator. Two diode switches are connected on one side to the reflecting transmission line and on the other side to ground so that, when a diode is actuated, it changes the location from which carrier wave energy is reflected by the reflecting transmission line. The carrier waves are directed to the reflecting transmission line via ports 1 and 2 of the circulator, are reflected from a location of the transmission line that depends on which diode switches have been actuated, and are directed toward a load via ports 2 and 3 of the circulator. The use of switches for reflecting energy is superior to variable reactances because losses can be made to be substantially negligible.

A straightforward method of providing four-level phase modulation would be to provide first, second, and third diodes along the reflecting transmission line, each for short-circuiting the reflecting transmission line when actuated. Then, with none of the switches actuated, the carrier wave would be given a first phase shift in response to reflection from the extreme end of the reflecting transmission line, a second phase shift when reflected by a first diode, a third phase shift when reflected by a second diode and a fourth phase shift when reflected by the third diode. Of course, as many diodes could theoretically be added as desired in accordance with the number of levels of desired phase modulation. Experience has shown, however, that the difficulty in tuning the reflecting transmission line to maximize efficiency increases rapidly with the number of switches included on a single line.

In accordance with one embodiment of the invention, four-level modulation is achieved by connecting a first diode to the reflecting transmission line through a susceptance having a normalized susceptance at the carrier frequency of $j2$, and directly connecting a second diode to the reflecting line between the first diode and the terminated end of the reflecting line. The electrical separation of the first and second diodes along the reflecting transmission line is $\lambda/16$, where $\lambda$ is the wavelength of the carrier waves, and the electrical separation of the second diode from the terminated end of the reflecting transmission line is $\lambda/4$. Four levels of digital phase modulation are applied by biasing the two diode switches such that neither is closed, only the first is closed, only the second diode switch is closed, or both are closed. As will be shown hereafter, the four switching operations respectively result in four different phase shifts to the carrier waves that are mutually in quadrature; that is, the respective phase shifts are 0, $\pi/2$, $\pi$ and $3\pi/2$ radians. A normalized susceptance of $-j2$ may also be used, in which case the electrical separation of the first and second diode switch is $3\lambda/16$.

These and other objects, features, and advantages will be better understood from a consideration of the following detailed description taken in conjunction with the accompanying drawing.

DRAWING DESCRIPTION

DETAILED DESCRIPTION

Figures 1, 2, 3, 4:
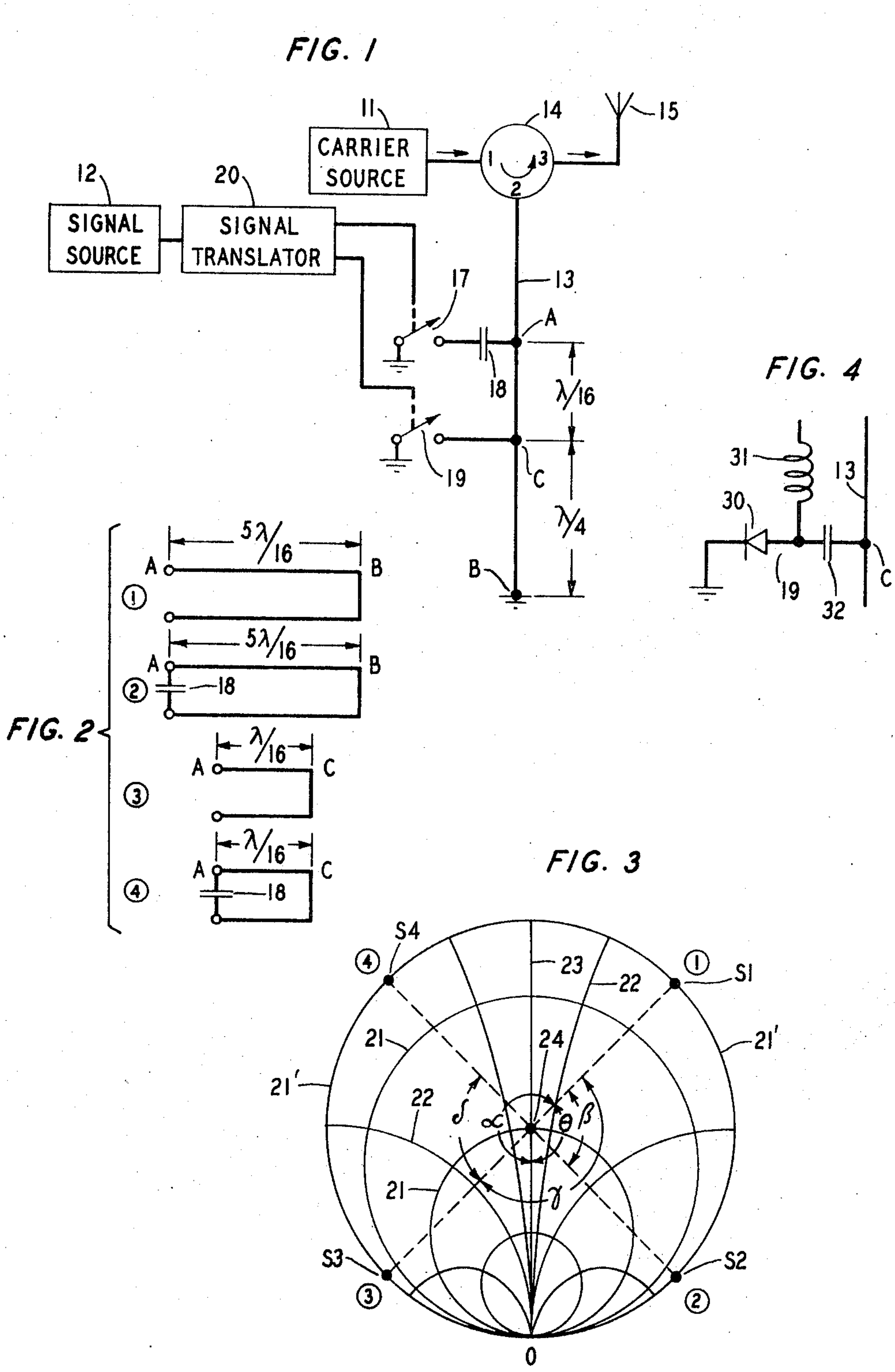
FIG. 1 is a schematic illustration of an illustrative embodiment of the invention.
FIG. 2 is a schematic illustration of four transmission lines, which is given as an aid in explaining the operation of the embodiment of FIG. 1.
FIG. 3 is an impedance graph of the type generally known as a Smith chart, which is given for purposes of explanation.
FIG. 4 is a schematic illustration of a high-speed diode switch of the type that may be used in the embodiment of FIG. 1.

Referring now to FIG. 1, there is shown a multiphase digital modulator for modulating the phase of high frequency carrier waves from a source 11 in accordance with multilevel digital signals from a source 12. A reflecting transmission line 13 is connected to the carrier wave transmission line by a circulator 14. The carrier waves are directed to the reflecting transmission line via circulator ports 1 and 2, are reflected by the reflecting line, and are thence directed, via ports 2 and 3, to an antenna 15, which constitutes the circuit load. A first switch 17 is connected to the reflecting transmission line by a capacitor 18 and a second switch 19 is directly connected to the reflecting transmission line. The switches 17 and 19 are actuated by signal energy via signal translator 20, their purpose being to phase modulate the carrier waves in accordance with signal information.

The particular phase modulator shown in a four-level modulator; that is digital information of four specific amplitude levels respectively impart any of four different phase shifts to the carrier wave. The translator 20 is made in a manner well known in the art to give selective actuation of switches 17 and 19 in response to the four discrete amplitude levels. The translator actuates neither of the switches in response to signal energy of the first level, it actuates or closes only switch 17 in response to signals of the second level, it actuates only switch 19 in response to signals of the third level, and it actuates both switches 17 and 19 in response to signal energy of a fourth level. The embodiment is designed such that the four signal levels will produce respective phase shifts of 0, $\pi/2$, $\pi$ and $3\pi/2$ radians, respectively. The maximum separation of $\pi/2$ radians or 90° between successive phase shifts minimizes degradation and discrimination problems. The switches are, of course, electronic and will be described more fully hereafter with reference to FIG. 4. The translator may, for example, be of the type shown in FIG. 11–19 of the book *Digital Principles*

*and Applications* by Malvino and Leach, McGraw-Hill Publishing Company, page 295, (1969).

For convenience, the four discrete phase shifts imparted to the carrier waves will be designated as states 1 through 4: state 1 is defined as a condition in which switches 17 and 19 are both open, in which case energy is reflected from the terminated end B of the reflecting transmission line 13; state 2 is the case in which only switch 17 is closed, which places capacitor 18 in parallel with terminated end B of the reflecting transmission line; state 3 is the condition in which only switch 19 is closed, which short-circuits the reflecting line at point C, thereby making point C the effective terminated end of the reflecting transmission line 17; and state 4 is the condition in which both switches 17 and 19 are closed, in which case capacitor 18 is placed in parallel with the terminated end C of the reflecting line 13. These four states are respectively illustrated in FIG. 2 as terminated transmission lines of varying length in which a reactance is or is not placed in parallel with the terminated end.

For the device to give modulation as described before, point C should be separated from point B by the electrical distance λ/4, where λ is the wavelength of the carrier frequency, and point A should be separated from point C by the electrical distance λ/16. The distances shown in FIG. 2 represent the effective lengths of the reflecting transmission line from reference point A. For example, the distance from point A to point B is 5λ/16 when switch 19 is opened; this is the distance shown in states 1 and 2 of FIG. 2. Assume further that the normalized susceptance of capacitor 18, with respect to reflecting line 13 at the carrier frequency, is equal to *j*2.

The fact that the various states illustrated in FIG. 2 give rise to carrier wave phase shifts successively separated by 90° or π/2 radians will be most clearly understood by reference to the Smith chart of FIG. 4. Curves 21 represent loci of constant conductance while curves 22 represent loci of constant susceptance. Curve 21' is the locus of zero conductance. As is well known, it is most convenient to work with admittances and susceptances when the microwave components considered are connected in parallel, because the phase shifts caused by component susceptances can then be added directly to those caused by line reflections.

Considering point A as a reference point, the reflecting transmission line in state 1 can be taken, for present purposes, as having an electrical length (5/16) λ as shown in the first sketch of FIG. 2. Reflected energy therefore travels a distance (⅝) λ when travelling from point A to point B and back again to point A. Since five-eighths of a wavelength equals 5π/4 radians, the reflected energy at point A will be 5π/4 radians, or 225°, out of phase with respect to incident energy at point A. The state 1 condition is therefore designated on the Smith chart of FIG. 3 as point S1, which is at an angle α, from the zero degree reference, of 225° or 5π/4 radians. Considering the state 1 transmission line of FIG. 2 to have zero resistive losses, the reflection coefficient ρ of that line is $$\rho = e^{j\theta} \qquad (1)$$

where θ is shown on FIG. 3 and is, in this case, (¾) π radians or $$\rho = e^{j\frac{3\pi}{4}} \qquad (2)$$

The purpose of this exercise is to establish point S1 on the Smith chart so that it can be used as a reference point to demonstrate that the phase shifts of the other states are separated by π/2 radians. Thus, for present purposes, point S1 may be taken as a zero phase shift reference point.

Examination of any conventional Smith chart will show that point S1 on the zero conductance curve 21' represents a normalized susceptance of approximately *j*0.42. When the capacitor 18 is added in state 2, as shown in FIG. 2, an additional normalized susceptance of *j*2 is added to the transmission line, which, of course, changes the phase shift of reflected energy at point A. To determine this change of phase shift, one may simply add the normalized susceptance *j*2 to the normalized susceptance *j*0.42 of S1 and arrive at the new normalized susceptance of state 2 of *j*2.42. Plotting that susceptance on the curve 21' of the Smith chart yields point S2 which is separated by the angle β from point S1. β is indicative of the difference in phase of reflected energy in state 2 with respect to reflected energy at point A in state 1 and, as can be seen from the graph, is equal to π/2 radians or 90°. Thus, a π/2 radian phase shift is produced when switching from state 1 to state 2.

In state 3, the effective reflecting transmission line length is only λ/16, which is a quarter wavelength shorter than that of state 1. The total electrical distance from point A to point C and back to point A, however, is a half wavelength shorter than the total distance from point A to point B and back to point A of state 1. Therefore, the phase of reflected energy at point A in state 3 differs from the phase of reflected energy in state 1 by a half wavelength or π radians. The point S3 on the Smith chart is therefore constructed to be displaced at an angle γ from point S1 equal to π/2 radians. It necessarily follows that the phase shift difference between states 2 and 3 is π/2 radians.

Examination of point S3 on the Smith chart will show that it represents a normalized susceptance of approximately −*j*2.42. As can be seen from FIG. 2, state 4 constitutes the step of adding the normalized susceptance *j*2 to the transmission line of state 3. Adding this susceptance gives a state 4 susceptance of −*j*0.42 which, on the curve 21', is located at point S4. Point S4, in turn, is located at an angle δ from point S3 of π/2 radians.

A similar analysis will show that the same results will obtain if a normalized susceptance of −*j*2 is inserted in the transmission by switching to state 2 or state 4, provided that the length between A and C is now 3λ/16. That is, the capacitor 18 may be replaced by an inductor of normalized susceptance −*j*2.

A primary advantage of the apparatus of FIG. 1 is that switches 17 and 19 can be extremely high-speed electronic diode switches, capable of switching the phase of millimeter wave carriers. Referring to FIG. 4, switch 19 of FIG. 1 may illustratively comprise a PIN diode 30, an RF choke 31, and a DC blocking capacitor 32. When a signal is applied through choke 31, it forward biases the diode to be conducting. In the conducting condition, the diode switch is closed and the grounded diode termination is reflected at point C as a short-circuit. Capacitor 32 is chosen to be large enough to be substantially lossless at the carrier wave frequency. The capacitor 18 associated with switch 17 may, if so desired, also act as a DC block, in which case capacitor 32 is not needed.

A PIN diode has been made having a suitably high response characteristic by growing a ν-type epitaxial layer with a doping concentration of approximately $10^{15}$ carriers per centimeter$^3$ on a 0.002 ohm-centimeter $n^{++}$substrate. A 0.25 micron deep boron diffusion is then applied to form a $p^{++}\nu n^{++}$structure. The ν layer thickness is chosen to be 2 microns, giving a corresponding breakdown voltage of 40 volts. The substrate thickness is reduced to approximately 10 microns to minimize the series resistance. It was found that a diode of this type is capable of switching a 55 gigahertz carrier between the two bias states at a rate of 300 megahertz, or to give a switching speed of 0.7 nanoseconds. Fifty-five gigahertz is, of course, a frequency which is well within the millimeter wave ranges being proposed for new communications systems.

The other components should, of course, be made to accommodate the carrier frequency and switching speeds used. For example, at microwave or millimeter wave carrier frequencies, all transmission lines should be waveguides or coaxial cables. Other diode forms may of course be used; Schottky barrier diodes have been found to be useful as high-speed switches and may be particularly suitable.

The foregoing has demonstrated that the embodiment of FIG. 1 provides four-phase digital modulation in which the four separate phases imparted to the carrier wave are mutually separated by π/2 radians, as is desired. As mentioned before, tuning becomes more convenient as the number of switches on a reflecting transmission line is reduced, and only two diodes give more convenient operation than three or more. The relative simplicity of structure is another advantage.

Various embodiments and modifications other than those explicitly described may be made and used by those skilled in the art without departing from the spirit and scope of the invention.

What is claimed is:

1. In combination:
a transmission line for transmitting carrier waves;
a source of signal energy;
means for converting said signal energy to four-level phase modulations of the carrier wave comprising first and second diode switches;
said first and second diode switches each being coupled on one side to a common reflecting line and on the other side to ground; one of said switches being coupled to said reflecting line by a reactance;
said first and second diode switches each constituting means, responsive to applied bias, for adjusting the location at which carrier wave energy is reflected;
the reflecting transmission line being terminated at one end by a connection to ground and being connected at another end by a circulator to the carrier wave transmission line;
and means for selectively biasing neither of the switches in response to signal energy of a first level, for biasing only the first diode switch in response to signal energy of a second level, for biasing only the second diode switch in response to signal energy of a third level, and for biasing both the first and second diode switches in response to signal energy of a fourth level, thereby to impart different phase shifts to the carrier waves in response to said four different signal energy levels.

2. The combination of claim 1 wherein:
the first switch is coupled to the reflecting line by a capacitor;
the second switch is directly connected to the reflecting line.

3. The combination of claim 2 wherein:
the capacitor has a normalized susceptance with respect to the reflecting transmission line of $j2$;
the electrical separation of the first and second diode switches, along the reflecting transmission line, is $\lambda/16$, where $\lambda$ is the wavelength of the carrier waves;
and the electrical separation of the second diode switch from the terminated end of the reflecting line is $\lambda/4$.

4. In combination:
a transmission line for transmitting carrier waves;
means comprising a reflecting transmission line, coupled to the carrier wave transmission line by a circulator, for reflecting carrier waves, thereby to determine the phase of such carrier waves;
means for phase modulating the carrier waves comprising first and second diodes;
said first diode being coupled through a reactance to the reflecting transmission line;
said second diode being directly coupled to the transmission line;
and means for selectively biasing said first and second diodes, thereby to modify the phase of said carrier waves by modifying the location of reflection.

5. The combination of claim 4 wherein:
the means for biasing the diodes comprises means for selectively biasing neither of the diodes in response to signal energy of the first level, for biasing only the first diode in response to signal energy of a second level, for biasing only the second diode in response to signal energy of a third level, and for biasing both the first and second diodes in response to signal energy of a fourth level, thereby to impart different phase shifts to the carrier waves in response to said four different signal energy levels.

6. The combination of claim 5 wherein:
the reflecting line is terminated by a connection to ground;
and the switches are connected on one side to ground.

7. In combination:
a transmission line for transmitting carrier waves;
means comprising a reflecting transmission line coupled to the carrier wave transmission line for reflecting carrier waves, thereby to determine the phase of such carrier waves;
means for phase modulating the carrier waves comprising first and second switches;
said first switch being coupled through a reactance to the reflecting transmission line;
said second switch being directly coupled to the transmission line;
the electrical separation of the first and second switches, along the reflecting transmission line, being $\lambda/16$, where $\lambda$ is the wavelength of the carrier waves;
the reactance having a normalized susceptance with respect to the reflecting transmission line at the carrier frequency of $j2$; and
means for selectively actuating said first and second switches, thereby to modify the location of reflection and phase of said carrier waves.

8. The combination of claim 7 wherein:
the switches are diodes and the reflecting line is coupled to the carrier wave transmission line by a circulator;
and the reactance is a capacitor.

9. In combination:
a transmission line for transmitting carrier waves;
means comprising a reflecting transmission line coupled to the carrier wave transmission line for reflecting carrier waves, thereby to determine the phase of such carrier waves;
means for phase modulating the carrier waves comprising first and second switches;
said first switch being coupled through a reactance to the reflecting transmission line;
said second switch being directly coupled to the transmission line;
the electrical separation of the first and second switches, along the reflecting transmission line, being $3\lambda/16$, where $\lambda$ is the wavelength of the carrier waves;
the reactance having a normalized susceptance with respect respect to the reflecting transmission line at the carrier frequency of $-j2$;
and means for selectively actuating said first and second switches thereby to modify the location of reflection and phase of said carrier waves.

* * * * *